(12) United States Patent
Lee et al.

(10) Patent No.: US 7,580,556 B2
(45) Date of Patent: Aug. 25, 2009

(54) IMAGE REGION PARTITIONING USING PRE-LABELED REGIONS

(75) Inventors: Shih-Jong J. Lee, Bellevue, WA (US); Tuan Phan, Lynnwood, WA (US)

(73) Assignee: DRVision Technologies LLC, Bellevue, WA (US)

( * ) Notice: Subject to any disclaimer, the term of this patent is extended or adjusted under 35 U.S.C. 154(b) by 825 days.

(21) Appl. No.: 10/767,530

(22) Filed: Jan. 26, 2004

(65) Prior Publication Data

US 2005/0163373 A1 Jul. 28, 2005

(51) Int. Cl.
*G06K 9/00* (2006.01)
*G06K 9/34* (2006.01)

(52) U.S. Cl. ......................... 382/133; 382/173

(58) Field of Classification Search .................. 382/173, 382/133
See application file for complete search history.

(56) References Cited

U.S. PATENT DOCUMENTS

| | | | |
|---|---|---|---|
| 5,666,212 A * | 9/1997 | Gilge | 382/243 |
| 6,658,143 B2 * | 12/2003 | Hansen et al. | 382/133 |
| 6,956,961 B2 * | 10/2005 | Cong et al. | 382/133 |
| 6,963,664 B2 * | 11/2005 | Braspenning et al. | 382/173 |

OTHER PUBLICATIONS

F.M. Richards, "Calculation of molecular volumes and areas for structures of known geometry," Methods in enzymology, vol. 115, 1985, pp. 440-464.*
1. Ogniewiez R. L. And Ilg, M. "Voronoi skeletons: Theory and applications," in IEEE Comp. Vision and Pattern Rec., pp. 63-69, Jun. 1992.
Ogniewicz, R. L. and Kubler. O "Hierarchic Voronoi Skeletons," Pattern Recognition, nr. 28, pp. 343-359, 1995.
A. Meijster, J. B. T. M. Roerdink, W. H. Hesselink, "A General Algorithm For Computing Distance Transforms In Linear Time," 2000.
Mihail N. Kolountzakis, Kiriakos N. Kutulakos, "Fast Computation of the Euclidean Distance Map for Binary Images," Information Processing Letters, 1992.
Haralick, R.M., Shapiro, L.G., "Computer and Robot Vision," vol. I, pp. 236-237, Addison-Wesley, 1992.

* cited by examiner

*Primary Examiner*—John B Strege (57) ABSTRACT

A two pass Zone Of Influence (ZOI) creation method creates a Zone Of Influence (ZOI) image. The two pass ZOI creation method performs a first pass scan to create a first pass intermediate distance image and a shortest distance component label image. It then performs a second pass scan using the first pass intermediate distance image and the shortest distance component label image to create a background distance transform image and a updated shortest distance component label image. An adaptive image region partition method allows distance lengths of the two pass adaptive ZOI creation method depend on their associated component labels.

3 Claims, 11 Drawing Sheets

IMAGE REGION PARTITIONING USING PRE-LABELED REGIONS

TECHNICAL FIELD

This invention relates to a method for adaptive image region partition and morphologic processing.

BACKGROUND OF THE INVENTION

Given an image that consists of a plurality of component regions, its image can be partitioned into zones of influence (ZOI). In the ZOI image, each pixel is associated with a component label. The component (foreground) pixels in the component regions are labeled by their component labels. The non-component (background) pixels are labeled by the labels of the component that is closest to the pixels.

ZOI is a powerful tool to integrate results of multiple images acquired from different aspects of the same objects of interest. In one typical application scenario, the component regions are detected from one image or one detection mode. The component regions are used to form the ZOI. The ZOI is then used to condition the detection or perform measurements of other images or other detection modes. One application example is cell analysis in high content screening, cancer diagnosis, prenatal testing, genetic testing, tissue-based pathology assays, etc. In this application, cell nuclei are stained and imaged in one image for nuclear segmentation. Whole cells or specific cell characteristics are stained and acquired in another image for whole cell or specific cell characteristics segmentation. Since nuclei tend to be isolated from each other and whole cells tend to overlap, it is advantageous to divide the cell regions guided by the nuclear segmentation. ZOI could be used for cell region separation.

The ZOI operation is related to skeletal influence zones which are derived from Voronoi skeletons or medial axes that transform a 2D object into 1D line representation (R. Ogniewicz and M. Ilg, "Voronoi skeletons: Theory and applications," in IEEE Comp. Vision and Pattern Rec., June 1992, pp. 63-69; Ogniewicz, R. L. and Kubler. O: Hierarchic Voronoi Skeletons, Pattern Recognition, nr. 28, pp. 343-359, 1995). Voronoi skeletons or medial axes are derived from the concept of distance transformation (A. Meijster, J. B. T. M. Roerdink, W. H. Hesselink, "A General Algorithm For Computing Distance Transforms In Linear Time", 2000; Mihail N. Kolountzakis, Kiriakos N. Kutulakos, "Fast Computation of the Euclidean Distance Map for Binary Images", Information Processing Letters, 1992). The ZOI operation is also related to recursive morphology (Haralick, R. M., Shapiro, L. G., "Computer and Robot Vision", Volume I, pp. 236-237, Addison-Wesley, 1992; Serra, J. "Image Analysis and Mathematical Morphology", PP. 385-387, Academic Press, 1982). The ZOI regions are constructed by recursive dilation and conditioning operations.

The distance transform can be computed sequentially by a two-pass procedure. The method is very fast. It requires $O(N^2)$ time for an N by N image. However, the skeletonization requires iterative thinning or similar techniques. The processing time of these methods is shape dependent and sometimes time consuming for complex shapes. The recursive morphology operation is not efficient for a general purpose computer and is time consuming for complex shapes. It is desirable to have a fast and time predictable method to partition regions into zones of influence.

The prior art ZOI method uses the same distance metric for all components. This is useful only for simple applications where all components are not differentiated. This is often not the case in practical applications. For example, in cell analysis applications, different cell types could be contained in the same image. In this case, it is disadvantageous to determine ZOI using the same distance metric across all cell types since large and small cells will be divided equally. It is desirable to have an adaptive ZOI algorithm that could adaptively apply a distance metric dependent on the component characteristics. For example, different distance scales could be used for different cell types or the distance could be scaled according to the size of the component.

The same limitation exists in morphological dilation or erosion operations and their combinations, such as opening and closing. The prior art morphological operations use the same structuring element for all pixels in an image. The structuring element cannot be adaptively changed according to a pixel's component region property. Therefore, when trying to fill holes of a component region, other regions may be merged. Thus, the connectivity (homotopic relations) is destroyed. It is desirable to have an adaptive morphological processing method that adaptively adjusts the structuring element size and shape according to the characteristics of the components.

OBJECTS AND ADVANTAGES

This invention provides a method for adaptive image region partition and morphologic processing. The partition is computed sequentially by a two-pass procedure similar to distance transformation. In addition to the shortest distance, the method tracks, propagates, and updates the component label where a pixel's shortest distance is derived. The method is very fast and the processing time is predictable and is component shape independent. It requires $O(N^2)$ time for an N by N image and is ideal for a use in a general purpose CPU. It could adaptively apply a distance metric depending on component characteristics. It enables adaptive morphological processing that allows adaptive adjustment of the structuring element size and shape according to characteristics of the components. Furthermore, the method enables adaptive integration of multiple channel information in cell analysis.

The primary objective of the invention is to perform fast image region partitioning. A secondary objective is to achieve processing speed mostly independent of component shape. Another objective of the invention is to adaptively apply a distance metric dependent on component characteristics. The fourth objective is to provide adaptive morphologic processing that allows adaptive adjustment of the structuring element size and shape according to the characteristics of the components. The fifth objective of the invention is to provide adaptive integration of multiple channel information in cell analysis for improved image measurement accuracy. The sixth objective of the invention is to reduce cost and increase availability by facilitating real time applications using general purpose CPUs.

SUMMARY OF THE INVENTION

A fast image region partition method receives a component labeled image and performs a two pass Zone Of Influence (ZOI) creation method to create a Zone Of Influence (ZOI) image. The two pass ZOI creation method performs a first pass scan to create a first pass intermediate distance image and a shortest distance component label image. It then performs a second pass scan using the first pass intermediate distance image and the shortest distance component label image to create a background distance transform image and a updated shortest distance component label image. An adaptive image region partition method receives a component labeled image and performs an adaptive two pass ZOI creation method to create an adaptive ZOI image. The distance lengths of the two pass adaptive ZOI creation method depend on their associated component labels.

An adaptive cell segmentation method receives a nuclei mask image and a cell mask image. It performs adaptive nuclei region partition using the nuclei mask image to create adaptive nuclei mask ZOI. An adaptive cell region separation method uses the cell masks and the adaptive nuclei mask ZOI to generate adaptive cell separated regions.

An adaptive dilation method receives an image and performs an adaptive background distance transform to create an adaptive background distance transform image. A threshold is applied to the adaptive background distance transform image to generate adaptive dilation image output. An adaptive erosion method receives an image and performs an adaptive foreground distance transform to create an adaptive foreground distance transform image. A threshold is applied to the adaptive foreground distance transform image to generate adaptive erosion image output.

BRIEF DESCRIPTION OF THE DRAWINGS

The preferred embodiment and other aspects of the invention will become apparent from the following detailed description of the invention when read in conjunction with the accompanying drawings, which are provided for the purpose of describing embodiments of the invention and not for limiting same, in which.

DETAILED DESCRIPTION OF THE INVENTION

I. Distance Transform

Given an image I, the foreground distance transform assigns each foreground pixel the shortest distance between the pixel and a background pixel. Conversely, the background distance transform assigns each background pixel the shortest distance between the pixel and a foreground pixel.

The distance transform is computed sequentially by a two-pass method. The first (forward) pass scans in a left-right top-bottom raster scan order. The second (backward) pass scans in a reverse right-left bottom-top order. In the first pass for a foreground distance transform, the output U(x,y) at pixel position (x,y) is determined by the value of input image I and the values at previously computed positions of U by $$U(x, y) = \begin{cases} \min_{(i,j) \in N^B(x,y)} \{U(i, j) + l(i, j)\}; \forall I(x, y) \in \text{foreground} \\ 0; \forall I(x, y) \in \text{background} \end{cases}$$

In one embodiment, the boundary condition is handled by setting $U(x,-1)=0$ and $U(-1,y)=0$. $N^B(x,y)$ is the backward neighbors of the pixel (x,y). The backward neighbor contains a selected set of adjacent neighbors that are already scanned in the first pass. l(i,j) is the neighbor position dependent distance length. When l(i,j)=1 for all (i, j) and $N^B(x,y)$ is the upper half of the 4-connected neighbor, thus, $N^B(x,y)=\{(x-1,y), (x,y-1)\}$, then the resulting distance is the well-known 4-connected city block distance ($L_1$). When l(i,j)=1 for all (i, j) and $N^B(x,y)$ is the upper half of the 8-connected neighbor, thus, $N^B(x,y)=\{(x-1,y), (x-1,y-1), (x,y-1), (x+1,y-1)\}$, then the resulting distance is the well-known 8-connected chessboard distance ($L_\infty$). For the 8-connected neighbor, when $l(x-1,y)=1$, $l(x-1,y-1)=\sqrt{2}$, $l(x,y-1)=1$, and $l(x+1,y-1)=\sqrt{2}$, the resulting distance is the well-known Euclidean distance ($L_2$).

The second (backward) pass creates the distance transform image D by $$D(x, y) = \min\left\{\min_{(i,j) \in N^F(x,y)} (D(i, j) + l(i, j)), U(x, y)\right\}$$

$N^F(x,y)$ is the forward neighbors of the pixel (x,y). The forward neighbor contains a selected set of adjacent neighbors that are already scanned in the second pass. For 4-connected city block distance, $N^F(x,y)$ is the lower half of the 4-connected neighbor. That is, $N^F(x,y)=\{(x+1,y), (x,y+1)\}$. For 8-connected chessboard distance and Euclidean distance, $N^F(x,y)$ is the lower half of the 8-connected neighbor. That is, $N^F(x,y)=\{(x+1,y), (x+1,y+1), (x,y+1), (x-1,y+1)\}$.

Figure 1A:
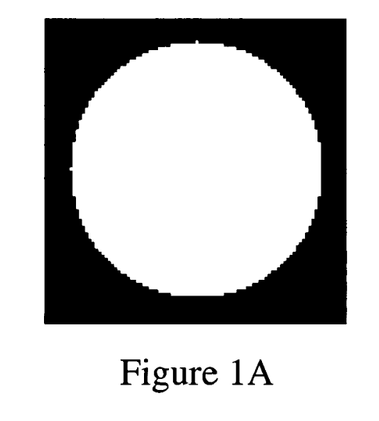
FIG. 1A shows a Euclidean disc.
Figure 1B:
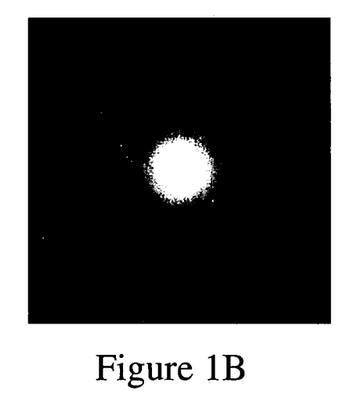
FIG. 1B shows the Euclidean distance transformed image of 1A.
Figure 1C:
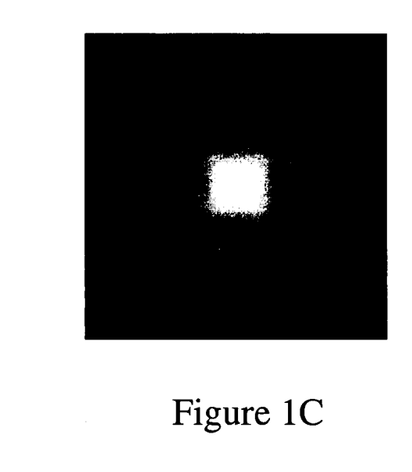
FIG. 1C shows the city block distance transformed image of 1A.
Figure 1D:
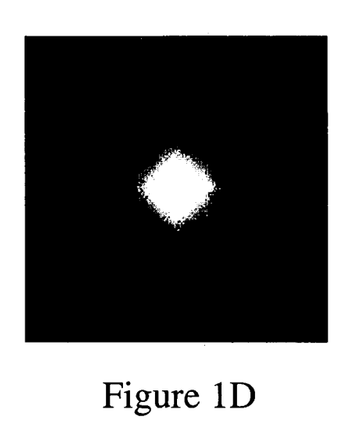
FIG. 1D shows the chessboard distance transformed image of 1A.

The images in FIG. 1A to FIG. 1D illustrate the three distance transforms applied to a Euclidean disc. FIG. 1A shows the Euclidean disc; FIG. 1B shows the Euclidean distance transformed image of FIG. 1A; FIG. 1C shows the city block distance transformed image of FIG. 1A; FIG. 1D shows the chessboard distance transformed image of FIG. 1A.

II. Medial Axis

Figure 2:
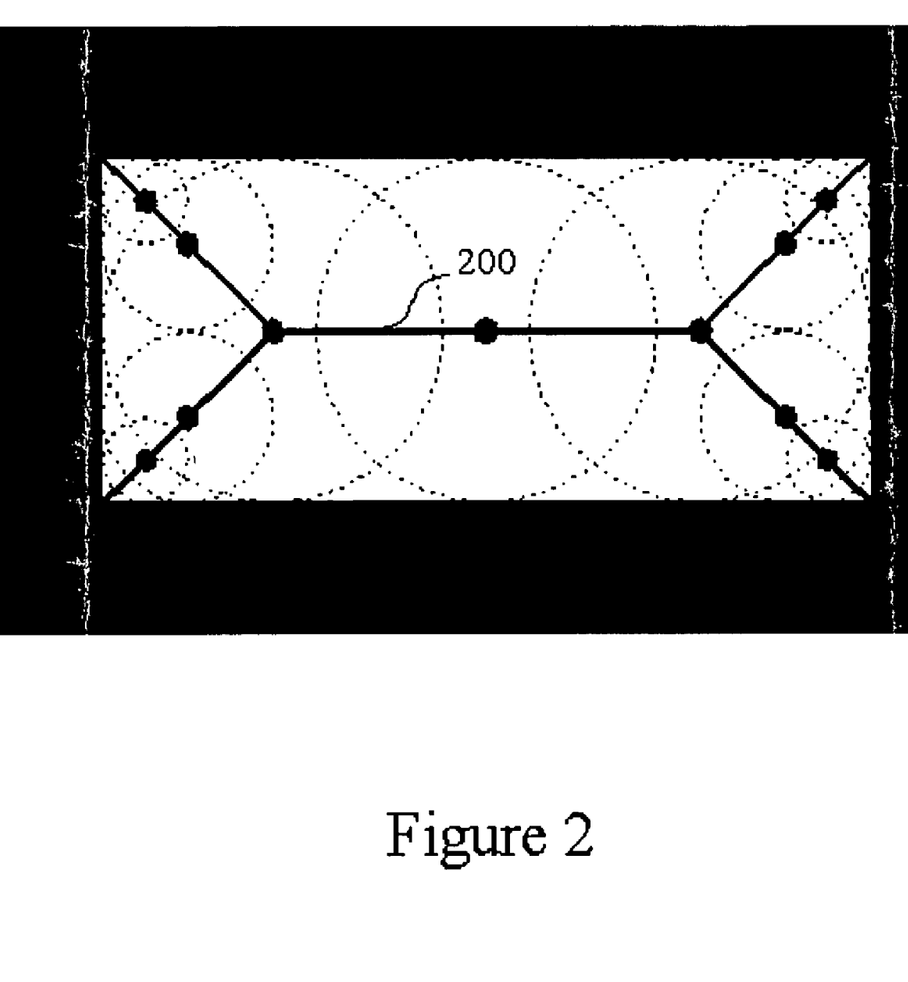
FIG. 2 shows the medial axis of a rectangle defined in terms of bi-tangent circles.

Medial axis or skeleton is initially introduced for shape description. The following hypothetical scenario can help visualize a medial axis. Let the shape be a region of grass surrounded by bare soil. Simultaneously at all boundary points of the grass region light a fire that burns uniformly from the border of the grass region to its interior. Eventually the fire burning from one part of the border will meet the fire burning from another part of the border. Since all the grass will have been burned at the meeting place, the fire will quench and be extinguished. The locus of points on the arc of fire extinction is the medial axis of the region. Another way to think about the medial axis is as the loci of centers of bi-tangent circles that fit entirely within the foreground region being considered. FIG. 2 illustrates this concept for a rectangular shape. The medial axis of a rectangle 200 is defined in terms of bi-tangent circles in FIG. 2.

Each point on the medial axis has an associated value that is proportional to the time it took for the fire to reach the given point from the time the grass fire was set. The medial axis with its medial axis distance function is called the medial axis transform. It is an information preserving representation of shape. To see this, just consider running the grass fire backward. With time running in reverse, set a grass fire on each point of the medial axis exactly at the time the original grass fire is extinguished at that point. The boundary of the fire at time t=0 would be the boundary of the original given shape.

The medial axis can be produced in two main ways. The first is to use morphological thinning that successively erodes away pixels from the boundary (while preserving the end points of line segments) until no more thinning is possible, at which point what is left approximates the medial axis (skeleton). An alternative method is to first calculate the distance transform of the image. The skeleton then lies along the singularities (i.e. creases or curvature discontinuities) in the distance transform image. The medial axis is often described as being the 'locus of local maxima' on the distance transform image. If the distance transform image is displayed as a 3-D surface plot with the third dimension representing the gray-scale value, the medial axis can be imagined as the ridges on the 3-D surface.

III. Zones of Influence

The distance transform can be applied to the background of the image and the skeleton or medial axis of the background could be defined. One type of background skeleton is the zone of influence. To define the zones of influence, begin with a representation of a set S as the union of its components $C_1, \ldots, C_N$:

$$S = \bigcup_{n=1}^{N} C_n$$

The zone of influence $Z_n$ associated with component $C_n$ is the set of all points that are closer to $C_n$ than to any other components. That is, $$Z_n = \{p | d(p, C_n) < d(p, C_m), m \neq n\}$$

where d(p,C) denotes the distance from the point p to the set C.

Given an image consisting of a plurality of component regions, its background (non-component regions) can be partitioned into zones of influence (ZOI). In the ZOI image, each pixel is associated with a component label. The foreground pixels in the component regions are labeled by their component labels. The background pixels are labeled by the labels of the component that is closest to the pixel. Note that the zones of influence could be defined even though the pixels in a component are not connected.

Figure 3:
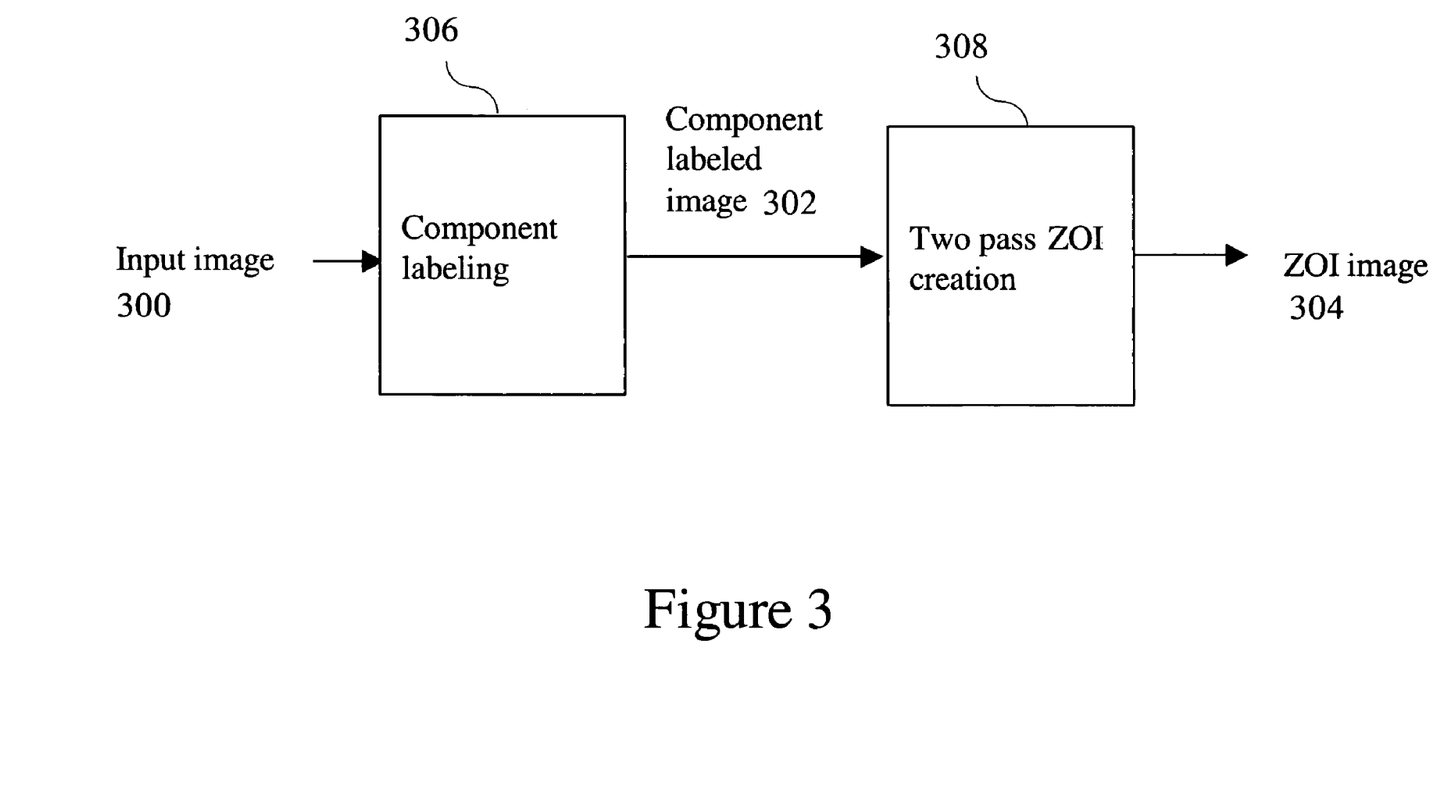
FIG. 3 shows the processing flow for the fast zones of interest creation method.

We now describe the fast image region partition (zones of influence creation) method of this invention. The processing flow of the fast zones of interest creation method is shown in FIG. 3. As shown in FIG. 3, the input image 300 is subject to component labeling 306 that assigns a unique label to each component; this results in the component labeled image 302. The component labeled image 302 is used by the two pass ZOI creation 308 method that uses a distance transformation-like two pass method to create the ZOI image 304. The method is very fast. It requires $O(N^2)$ time for an N by N image.

III.1 Component Labeling

In the case that the connectivity is required for each component, the standard connected component labeling method could be used to generate the component labeled image. As mentioned previously, pixels in a component do not have to be connected. Those skilled in the art should recognize that other labeling methods such as manual labeling, semi-automatic labeling, image segmentation and clustering could be used.

III.2 Two Pass ZOI Creation

Given a component labeled image L, the two pass ZOI creation method sequentially computes the ZOI image by a two-pass method. Similar to the distance transformation method, the first (forward) pass scans in a left-right top-bottom raster scan order. The second (backward) pass scans in a reverse right-left bottom-top order. In the first pass, an output first pass intermediate distance image value F(x,y) and a shortest distance component label image Z(x,y) at pixel position (x,y) are determined by the value of component labeled image L and the previously computed F and Z values by the following algorithm:

$$F(x, y) = \begin{cases} \min_{(i,j) \in N^B(x,y)} F(i, j) + l(i, j); \forall L(x, y) \in \text{background} \\ 0; \forall L(x, y) \in \text{foreground} \end{cases}$$

$$Z(x, y) = \begin{cases} Z\left(\arg\min_{(i,j) \in N^B(x,y)} \{F(i, j) + l(i, j)\}\right); \\ \forall L(x, y) \in \text{background} \\ L(x, y); \forall L(x, y) \in \text{foreground} \end{cases}$$

The first pass intermediate distance image F stores the first pass intermediate distance values and the shortest distance component label image Z(x,y) stores the label of the component that has the shortest intermediate distance to pixel (x,y).

In one embodiment, we handle the boundary condition by setting F(x,−1)=0 and F(−1,y)=0. Those skilled in the art should recognize that other methods of boundary condition handling could be used and they are all within the scope of this invention.

The second pass produces the background distance transform image D and updates the shortest distance component label image, Z(x,y), by $$D(x, y) = \min\left\{\min_{(i,j) \in N^F(x,y)} (D(i, j) + l(i, j)), F(x, y)\right\}$$

$$Z(x, y) = \begin{cases} Z\left(\arg\min_{(i,j) \in N^F(x,y)} \{D(i, j) + l(i, j)\}\right); \\ \text{If } \min_{(i,j) \in N^F(x,y)} \{D(i, j) + l(i, j)\} < F(x, y) \\ Z(x, y); \text{Otherwise} \end{cases}$$

The updated Z(x,y) of the second pass stores the label of the component that has the shortest distance to pixel (x,y). Therefore, the final Z is the resulting ZOI image. The length function l(i,j) and the forward and backward neighbors, $N^F(x,y)$ and $N^B(x,y)$, of a pixel (x,y) can be selected so that the distance metric used for the ZOI could be city block distance ($L_1$), chessboard distance ($L_\infty$), Euclidean distance ($L_2$), or other distance metrics.

Those skilled in the art will recognize that the scanning directions of the first pass and the second pass could be reversed. Furthermore, other complementary scanning directions could be used and they are all within the scope of this invention. For example, the first pass could be scanned in a right-left top-bottom scan and the second pass could be scanned in a left-right bottom-top scan order. Other configurations of the forward and backward neighbors can also be used.

IV. Adaptive Image Region Partition

The prior art zone of influence method assumes that a fixed distance metric is used throughout the ZOI determination. This treats each component equally and represents a major limitation in practice. For example, in cell analysis applications, different cell types could be contained in the same image. In this case, it is disadvantageous to determine ZOI using the same distance metric across all cell types since large and small cells will be divided equally. It is desirable to have an adaptive ZOI algorithm that could adaptively apply a distance metric depending on component characteristics. For example, different distance scales could be used for different cell types or the distance could be scaled according to the size of the component.

The adaptive image region partition method of this invention is accomplished by making the length function $l(i,j)$ dependent on component labels. The first pass of the adaptive two pass ZOI creation method outputs a first pass intermediate adaptive distance image $F_A$ and an adaptive shortest distance component label image $Z_A$ by the following algorithm $$F_A(x, y) = \begin{cases} \min_{(i,j) \in N^B(x,y)} \{F_A(i, j) + l[(i, j), Z_A(i, j)]\}; \\ \forall L(x, y) \in \text{background} \\ 0; \forall L(x, y) \in \text{foreground} \end{cases}$$

$$Z_A(x, y) = \begin{cases} Z_A\left(\arg\min_{(i,j) \in N^B(x,y)} \{F_A(i, j) + l[(i, j), Z_A(i, j)]\}\right); \\ \forall L(x, y) \in \text{background} \\ L(x, y); \forall L(x, y) \in \text{foreground} \end{cases}$$

The second pass produces the adaptive distance transform image DA and updates the adaptive shortest distance component label image, $Z_A(x,y)$, by $$D_A(x, y) = \min\left\{\min_{(i,j) \in N^F(x,y)} (D_A(i, j) + l[(i, j), Z_A(i, j)]), F_A(x, y)\right\}$$

$$Z_A(x, y) = \begin{cases} Z_A\left(\arg\min_{(i,j) \in N^F(x,y)} \{D_A(i, j) + l[(i, j), Z_A(i, j)]\}\right); \\ \text{If } \min_{(i,j) \in N^F(x,y)} \{D_A(i, j) + l[(i, j), Z_A(i, j)]\} < F_A(x, y) \\ Z_A(x, y); \text{Otherwise} \end{cases}$$

Note that the length $l[(i,j),Z_A(i,j)]$ is a function of the neighboring position $(i,j)$ as well as the neighbor's associated component labels, $Z_A(i,j)$. When the forward and backward neighbors, $N^F(x,y)$, $N^B(x,y)$, are defined as a super set of all desirable neighbors, a desirable distance metric for a component label l could be constructed by providing appropriate length values among the neighbor points. If the super set neighbor includes unnecessary positions, they can be effective disabled by the assignment of large length values for the positions.

Those skilled in the art will recognize that the scanning directions of the first pass and the second pass could be reversed. Furthermore, other complementary scanning directions could be used and they are all within the scope of this invention. For example, the first pass could be scanned in a right-left top-bottom scan and the second pass could be scanned in a left-right bottom-top scan order. Other configurations of the forward and backward neighbors can also be used.

In one embodiment of the invention, a component specific weighting factor, W(c), is applied to the original length function for adaptive image region partition. That is, $$l[(i,j),Z(i,j)]=l(i,j)*w(Z(i,j))$$

Where w(c) could be related to the size of the component or other factors such as the confidence or the types of the components.

Those skilled in the art should recognize that the length function could be any linear or nonlinear functions of the component labels. They are all within the scope of this invention.

Figure 4:
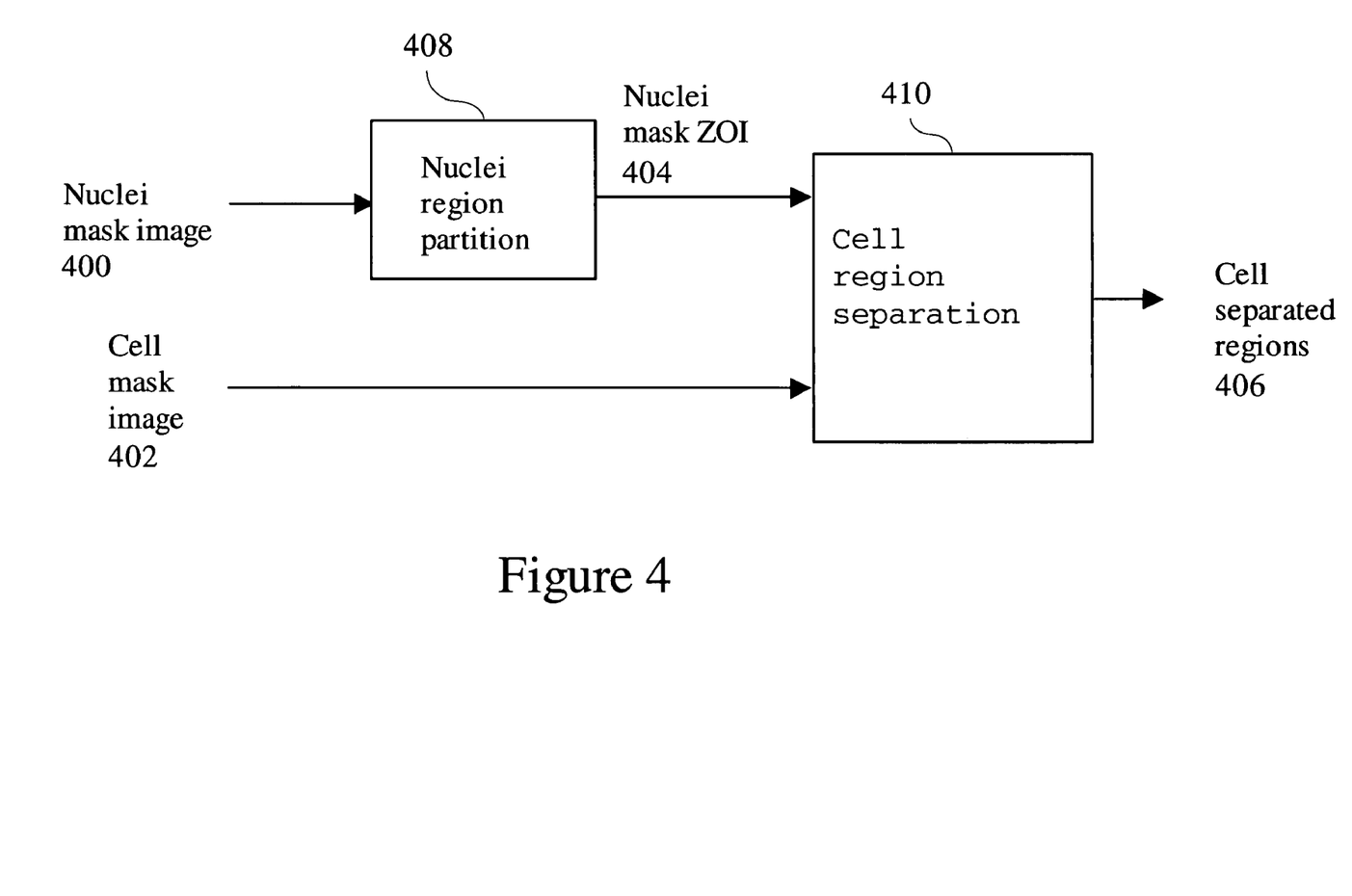
FIG. 4 shows the processing flow for a cell segmentation method.

The image region partition method can be used for cell analysis. FIG. 4 shows the processing flow of a cell segmentation method. As shown in FIG. 4, the input nuclei mask image 400 is processed by the nuclei region partition 408 method to create nuclei mask ZOI 404. The nuclei region partition 408 can be performed using the fast zones of interest creation method. The cell mask image 402 and the nuclei mask ZOI 404 are used by a cell region separation 410 step to create cell separated regions 406 output.

The cell region separation 410 step considers the cell mask having the same component label in the nuclei mask ZOI 404 as one cell region. This results in the cell separated regions 406 output.

Figure 5A:
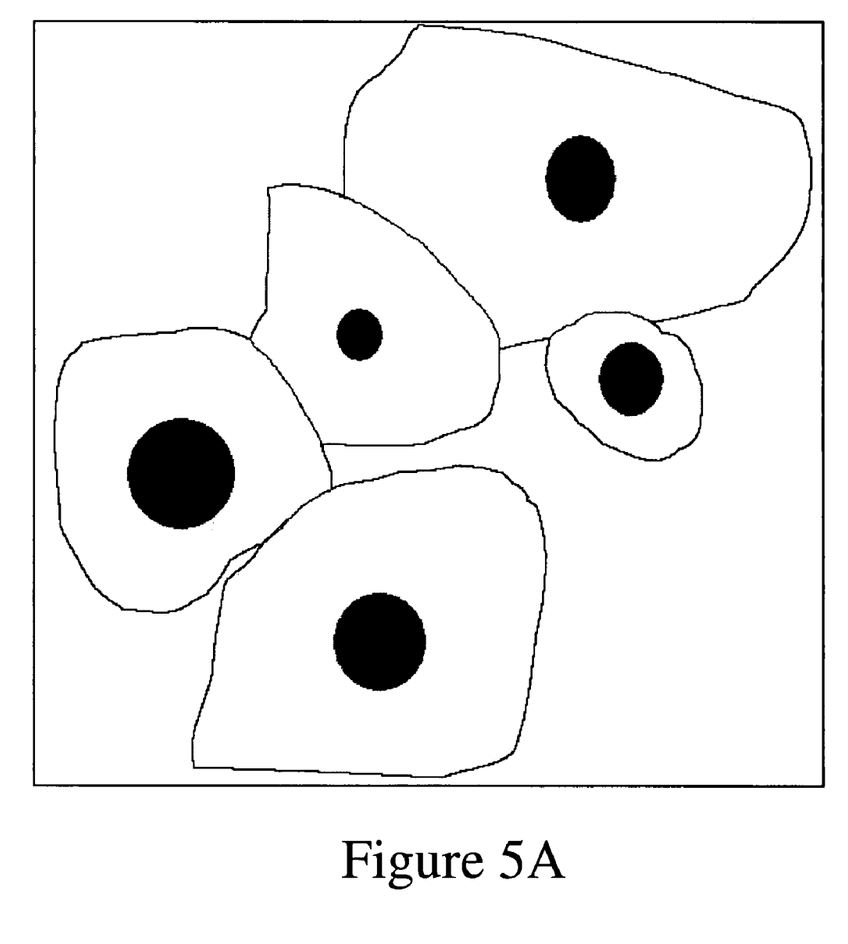
FIG. 5A shows an illustrative image containing 5 cells of different types.
Figure 5B:
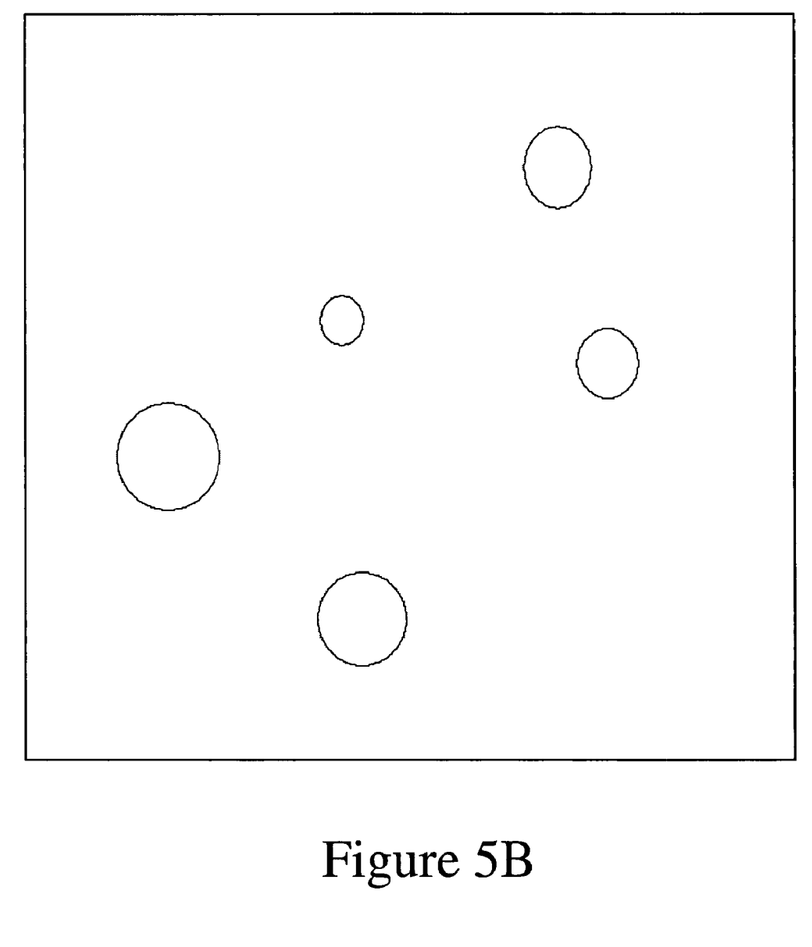
FIG. 5B shows the nuclei masks of 5A.
Figure 5C:
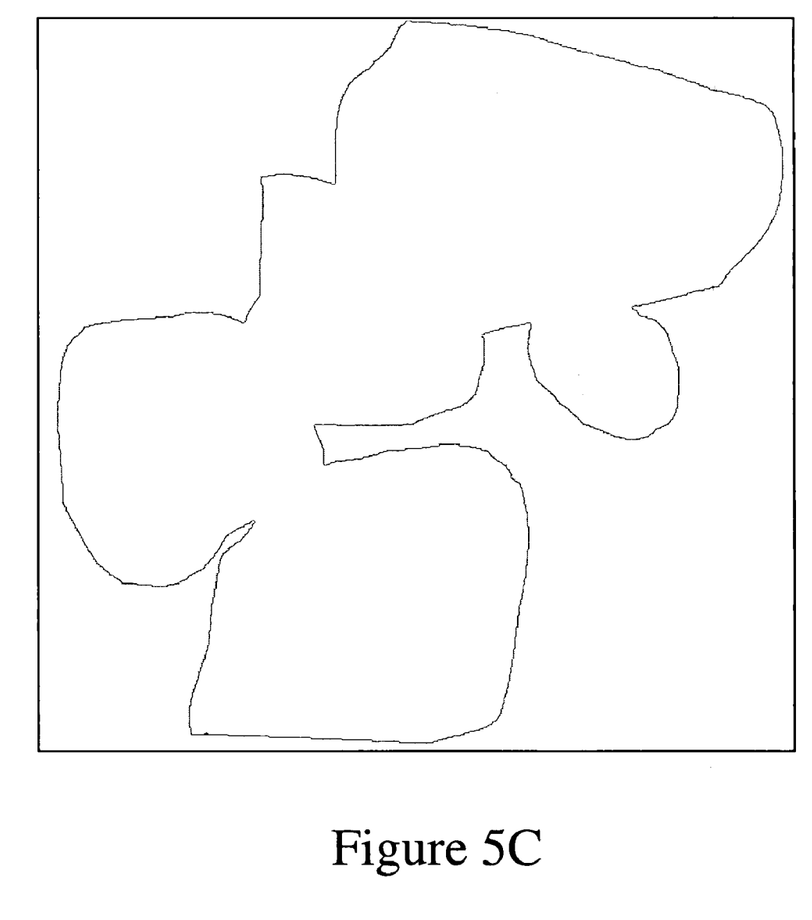
FIG. 5C shows the cell masks of 5A.

FIG. 5A to FIG. 5D illustrates an example of cell segmentation method. FIG. 5A shows an illustration of an image with 5 cells of different types. The component image contains nuclei masks and the whole cell image contains cell masks as illustrated in FIG. 5B and FIG. 5C.

Figure 5D:
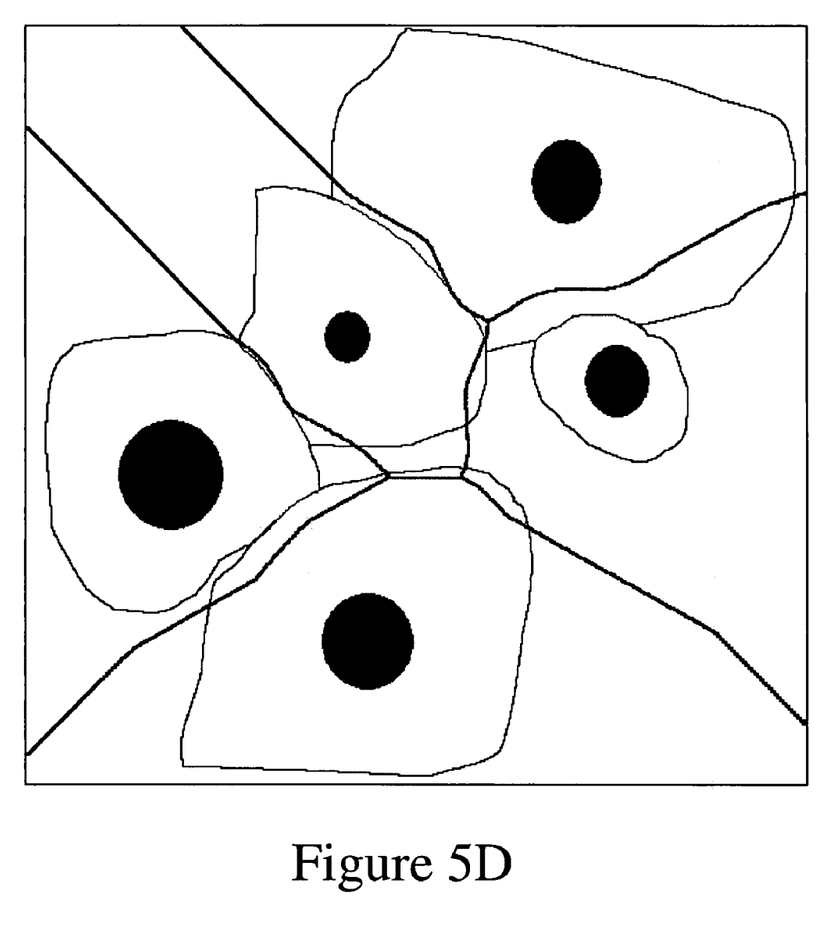
FIG. 5D shows the overlay of nuclei mask ZOI boundaries on the cell image of 5A.

FIG. 5D illustrates the overlay of the nuclei mask ZOI using static Euclidean distance. The cell mask can be separated by the nuclei mask ZOI as shown in FIG. 5D. Note that the static distance cuts the cell in the middle of two nuclei, which incorrectly partitions part of cytoplasm of the large cells into smaller cells.

The adaptive image region partition method could be applied to improve performance. An adaptive cell segmentation method inputs a nuclei mask image and a cell mask image. It performs adaptive nuclei region partition using the nuclei masks to create adaptive nuclei mask ZOI. It then performs adaptive cell region separation using the cell masks and the adaptive nuclei mask ZOI to generate adaptive cell separated regions output.

Figure 5E:
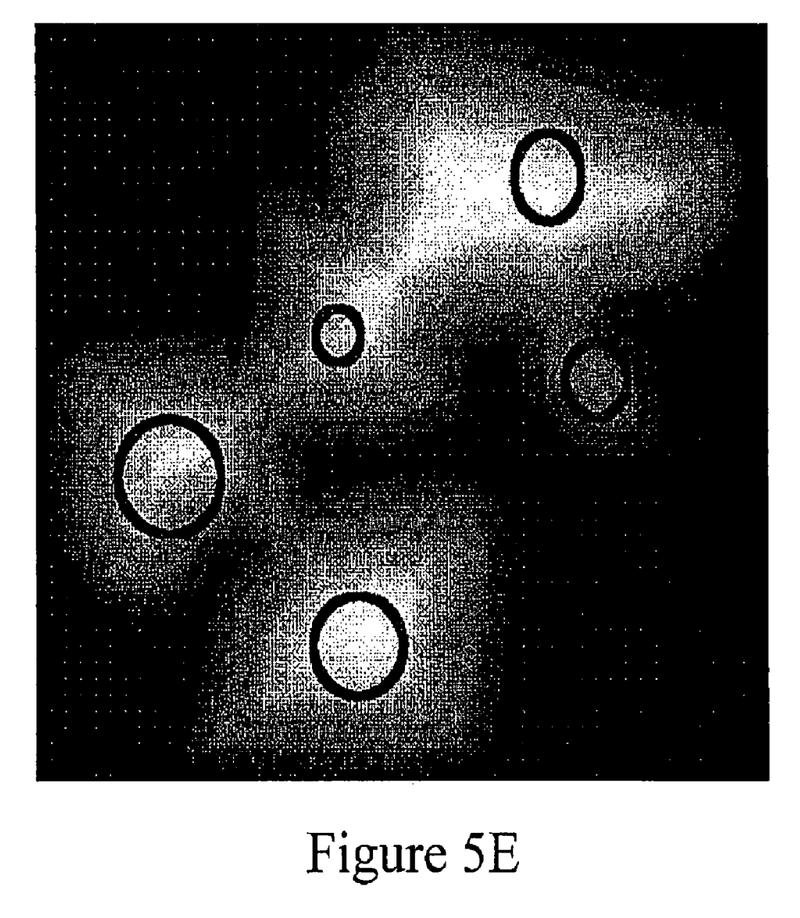
FIG. 5E shows the distance transform of the cell masks of 5C.
Figure 5F:
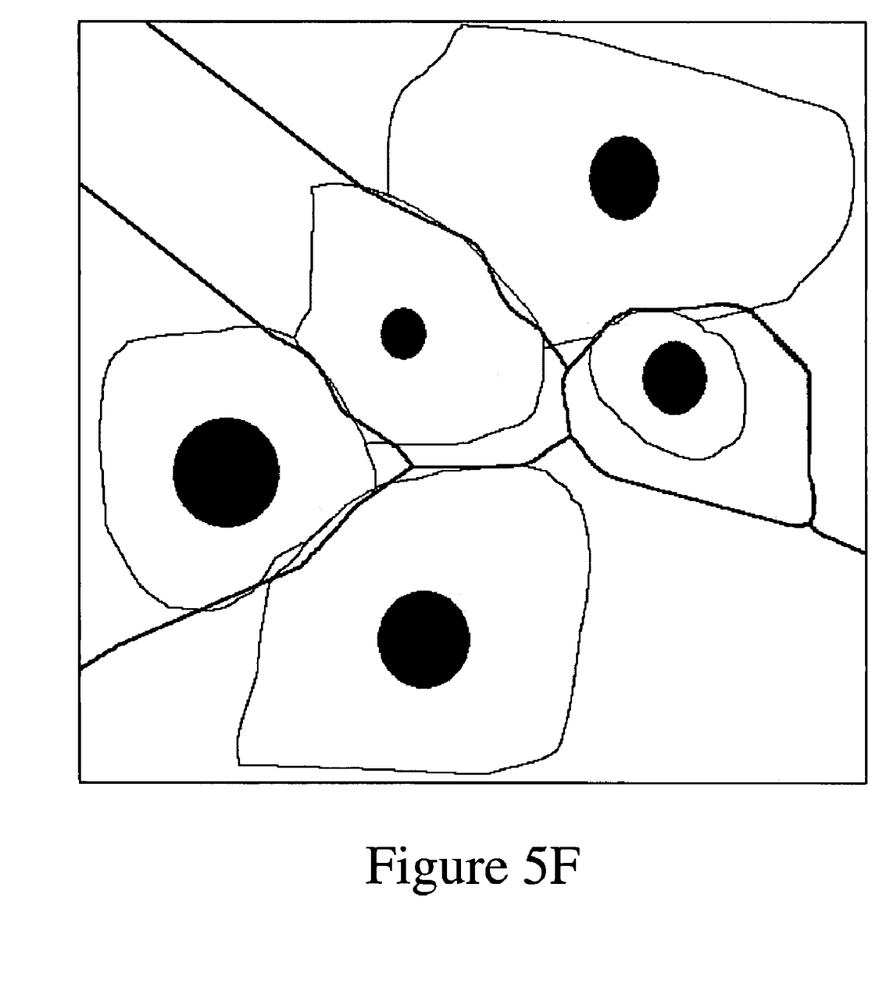
FIG. 5F shows the overlay of adaptive nuclei mask ZOI boundaries on the cell image of 5A.
Figure 5G:
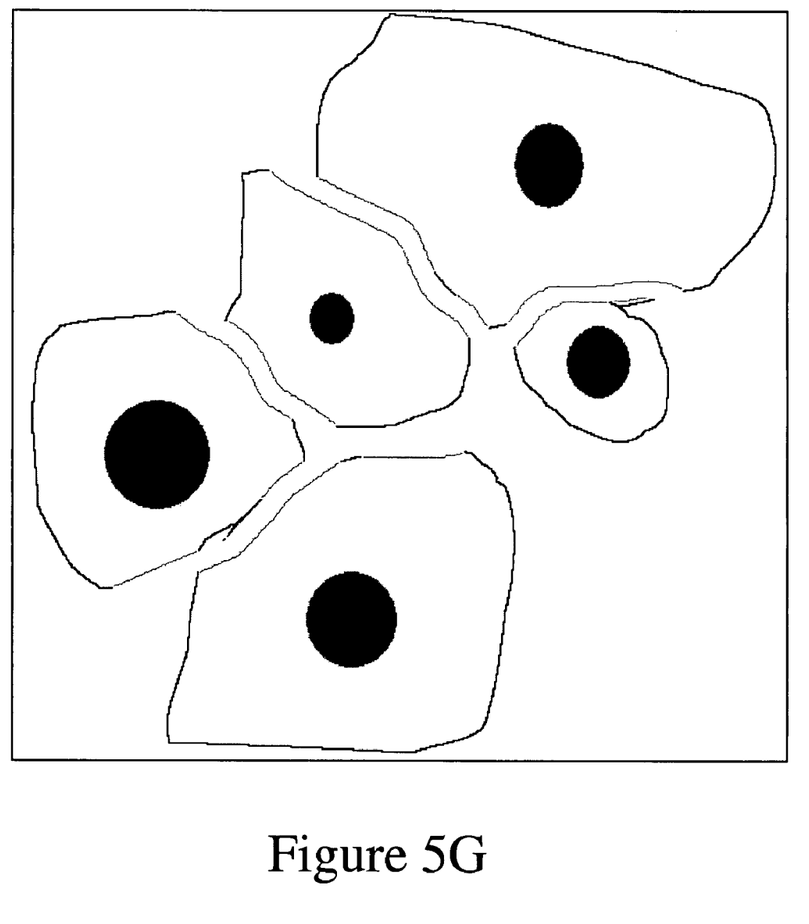
FIG. 5G shows the cell region segmentation of 5A after removing the pixels along the adaptive nuclei mask ZOI boundaries.

The adaptive nuclei region partition method uses cell size estimate for the weighting factor of the length function. FIG. 5E shows the distance transform of the cell masks. In one embodiment of the invention, the cell size estimate is performed by averaging the cell distance values within a nucleus. Let the cell size estimate for nucleus i be $S_i$. In one embodiment of the invention, the median value of $S_i$ among all nuclei in the image is determined as S'. A weighting factor could be determined for each component as w(i)=Min (a, Max(b, S'/$S_i$)) Where a>b. a and b are determined by the expected size difference between cells in the same image. In one embodiment of the invention, the values are set to a=2.0 and b=0.5. FIG. 5F shows the overlay of the adaptive nuclei mask ZOI boundaries on the cell image. An enhancement could be performed by excluding the pixels close to the adaptive nuclei mask ZOI boundaries. This further removes incorrect cytoplasm pixels to allow accurate cytoplasm measurements. FIG. 5G shows the results of this exclusion.

V. Adaptive Morphological Processing

The morphological dilation and erosion operations can be accomplished by distance transform followed by thresholding. Dilation can be accomplished by applying a distance transform on the image background and then applying the thresholding. The thresholding operation selected the pixels whose values are less than or equal to the threshold value in the resulting mask. Erosion can be accomplished by applying a distance transform on the image foreground and then applying the thresholding. In this method, the distance metric determines the structuring element shape and the threshold value determines the size of the structuring element.

The prior art morphological dilation, erosion operations and their combinations such as opening and closing use a common structuring element for all pixels in an image. The structuring element cannot be adaptively changed according to a pixel's component region property. Therefore, when trying to fill the holes of a component region, other regions may be merged and therefore, the connectivity (homotopic relations) destroyed.

As described in section IV, the adaptive image region partition of this invention generates not only the Zone of influence image Z but also the adaptive background distance transform image DA. Applying threshold to the adaptive background distance transform image results in the adaptive dilation image output.

Adaptive erosion can be accomplished by performing adaptive foreground distance transform to create an adaptive foreground distance transform image. This is followed by applying a threshold on the adaptive foreground distance transform image to create the adaptive erosion image output.

In one embodiment of the invention, the adaptive foreground distance transform is accomplished using a two-pass procedure. Similar to the standard distance transformation method, the first (forward) pass scans in a left-right top-bottom raster scan order. The second (backward) pass scans in a reverse right-left bottom-top order. In the first pass, the output image values $F(x,y)$ at pixel position $(x,y)$ is determined by the value of component labeled image L and the values at previously computed positions of F by the following algorithm:

$$F(x, y) = \begin{cases} \min_{(i,j) \in N^B(x,y)} \{F(i, j) + l[(i, j), L(i, j)]\}; \\ \forall L(x, y) \in \text{foreground} \\ 0; \forall L(x, y) \in \text{background} \end{cases}$$

The second pass produces the adaptive foreground distance transform image $D_F(x,y)$, by $$D_F(x, y) = \min\left\{\min_{(i,j) \in N^F(x,y)} (D_F(i, j) + l[(i, j), L(i, j)]), F(x, y)\right\}$$

Note that the length $l[(i,j),Z(i,j)]$ is a function of the neighboring position $(i,j)$ as well as the component labels, $L(i,j)$.

When the forward and backward neighbors, $N^F(x,y)$ and $N^B(x,y)$, are defined as a super set of all desirable neighbors, a desirable distance metric for a component label l could be constructed by providing appropriate length values among the neighbor points. If the super set neighbor includes unnecessary positions, they can be effective disabled by the assignment of large length values on these positions.

Those skilled in the art will recognize that the scanning directions of the first pass and the second pass could be reversed. Furthermore, other complementary scanning directions could be used and they are all within the scope of this invention. For example, the first pass could be scanned in a right-left top-bottom scan and the second pass could be scanned in a left-right bottom-top scan order. Other configurations of the forward and backward neighbors can also be used.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. An adaptive image region partition method using a computer or processor to carry out the steps of:
  a) Input a component labeled image and its associated characteristics for each component;
  b) Perform an adaptive two pass ZOI creation method using the component labeled image and component characteristics to create an adaptive ZOI image using a length function I wherein a component specific weighting factor w is applied to the length function to generated a component weighted length:

$$l[(i,j),Z(i,j)]=l(i,j)*w(Z(i,j))$$

wherein w is a general function of component characteristics that is related to one of component size, component confidence, or types of components and $Z(i,j)$ is component labeled image value at image position $(i,j)$.

2. The adaptive image region partition method of claim 1 wherein the adaptive two pass ZOI creation step comprises the steps of:
  a) Perform a first pass scan using the component labeled image and component characteristics to create a first pass intermediate adaptive distance image and an adaptive shortest distance component label image wherein the adaptive distance image having distance metric based on the component weighted length;
  b) Perform a second pass scan using the first pass intermediate adaptive distance image and the adaptive shortest distance component label image to create an adaptive distance transform image and an updated adaptive shortest distance component label image wherein the adaptive distance transform image having distance metric based on the component weighted length.

3. An adaptive cell segmentation method using a computer or processor to carry out the steps of:
  a) Input a nuclei mask image, its component labeled image and component characteristics;
  b) Input a cell mask image;
  c) Perform adaptive nuclei region partition using the nuclei mask component labeled image and component characteristics to create adaptive nuclei mask ZOI using a length function 1 wherein a component specific weighting factor w is applied to the length function to generate a component weighted length:

$$l[(i,j),Z(i,j)]=l(i,j)*w(Z(i,j))$$

wherein w is a general function of component characteristics that is related to one of component size, component confidence, or types of components and $Z(i,j)$ is component labeled image value at image position $(i,j)$;

d) Perform adaptive cell region separation using the cell masks and the adaptive nuclei mask ZOI to generate adaptive cell separated regions wherein the adaptive cell mask having the same component label in the nuclei mask ZOIs is considered as one cell region.

* * * * *